United States Patent
De Mol et al.

(10) Patent No.: US 6,405,672 B1
(45) Date of Patent: Jun. 18, 2002

(54) SYSTEM AND A METHOD FOR MONITORING THE PHYSICAL CONDITION OF A HERD OF LIVESTOCK

(75) Inventors: Rudolfus M. De Mol, Rhenen; Albertus Keen, deceased, late of Randwijk, both of (NL), by Dirkje Keen-Dik, legal representative

(73) Assignee: Delaval International AB, Tumba (SE)

( * ) Notice: Subject to any disclaimer, the term of this patent is extended or adjusted under 35 U.S.C. 154(b) by 30 days.

(21) Appl. No.: 09/202,380
(22) PCT Filed: Jun. 14, 1996
(86) PCT No.: PCT/EP96/02604
§ 371 (c)(1), (2), (4) Date: Jul. 11, 2000
(87) PCT Pub. No.: WO97/47187
PCT Pub. Date: Dec. 18, 1997

(51) Int. Cl.[7] .............. A01J 3/00; A01J 5/00
(52) U.S. Cl. ................ 119/14.15; 119/14.14
(58) Field of Search ............ 119/14.14, 14.15, 119/14.17, 14.18, 14.38

(56) References Cited

U.S. PATENT DOCUMENTS

| | | | |
|---|---|---|---|
| 5,152,246 A | | 10/1992 | Wakui et al. ............ 119/14.15 |
| 5,778,820 A | * | 7/1998 | van der Lely et al. ..... 119/14.18 |
| 5,832,868 A | * | 11/1998 | Oosterling ............... 119/14.14 |
| 5,873,323 A | * | 2/1999 | van den Berg et al. ... 119/14.15 |
| 5,988,106 A | * | 11/1999 | vam den Berg .......... 119/14.18 |
| 5,996,529 A | * | 12/1999 | Sissom et al. ........... 119/14.14 |

FOREIGN PATENT DOCUMENTS

| | | |
|---|---|---|
| EP | 657098 | 12/1994 |
| WO | WO 9419934 | 9/1994 |

OTHER PUBLICATIONS

Journal of Dairy Science, vol. 73, No. 2, 1990, pp. 539–548 entitled Modeling Daily Milk Yield in Holstein Cows Using Time Series Analysis.
Journal of Dairy Science, vol. 74, No. 2, 1991, pp. 436–445 entitled Change of Milk Yield with Clinical Diseases for a High Producing Dairy Herd.
*Forecasting, structural time series models and the Kalman filter* by Andrew C. Harvey (1989).
Journal of the Royal Statistical Society—Series B (Methodologocal) vol. 38, No. 3, 1976 (pp. 205–247.

\* cited by examiner

Primary Examiner—Charles T. Jordan
Assistant Examiner—Elizabeth Shaw
(74) *Attorney, Agent, or Firm*—Hovey, Williams, Timmons & Collins

(57) ABSTRACT

In a system and a method for monitoring the physical condition of a herd of livestock, errors between values predicted in accordance with a time-series model and corresponding measured values are used for determining a confidence interval for a prediction for each animal individually the significance of an error between a prediction and a measured value regarding the likelihood that the animal is in heat or suffers from a disease is automatically assessed for each animal individually. There is no need to determine dedicated confidence intervals for different situations and properties. A better fit of the time-series model automatically results in a narrowed confidence interval.

13 Claims, 2 Drawing Sheets

SYSTEM AND A METHOD FOR MONITORING THE PHYSICAL CONDITION OF A HERD OF LIVESTOCK

BACKGROUND OF THE INVENTION

1. Field of the Invention

The system shown in FIG. 1 is integrated with a milking stand 1 for milking individual cows one by one. The milking stand further includes a milking device with four suction cups 2–5, to be connected to a cow for withdrawing milk from that cow. Milk channels 5'–8' are connected at their upstream ends to suctions cups 2–and at their downstream ends to the conductive sensors 9–12. The conductivity sensors 9–12 are part of a conductivity measurement unit 13. In the conductivity measurement unit 13, the milk channels 5'–8' merge downstream from the conductivity sensors 9–12 into a single milk channel 14 passing through a flow meter 15 for measuring the milk yield.

2. Description of the Prior Art

In 'Modelling Daily Milk Yield in Holstein cows Using Time-series Analysis' by Deluyker et al. in the Journal of Dairy Science, 73:539–548, an experimental method for automatically monitoring the physical condition of a herd of livestock is described which includes the steps of: measuring a value of a property at regular intervals from each individual, identified animal, storing measurement data in accordance with the measured values of the measured property for each individual, identified animal, determining a prediction for a subsequent measured value of that property for the respective individual, identified animal from the stored measurement data regarding that individual, identified animal, and generating an attention signal in response to an error between the value of the measured property and the prediction for that value above a predetermined level.

In this experimental method, the measured property was the milk yield.

For carrying out the measurements an automated cow identification and milk yield recording system was used.

After the observation period, a time-series model was formulated for predicting the milk yield of each milking or set of three successive milkinq with sets of parameters each generally applicable in a particular period of time during a lactation for either heifers or multiparous cows.

A disadvantage of this described method is, that it is cumbersome in that for each cow the appropriate set of parameters has to be selected. This also forms a potential source of errors. Furthermore, it is unlikely that the determined parameters will also apply to herds of cows of different races or even herds of other animals (e.g. goats), herds kept in other climates or fed with different types of feed.

SUMMARY OF THE INVENTION

It is an object to the invention to provide a reliable system and a method for automated monitoring the physical condition of a herd of animals which is more universally applicable than the model proposed by Deluyker et al.

According to the invention, this object is achieved by providing a system as described in claim 1 and a method as described in claim 5.

Since, in the method according to the invention and, in operation, in the system according to the invention, during a lactation, error data are stored in accordance with predicted values and corresponding measured values for each individual, identified animal, and a confidence interval for a prediction is determined for each individual, identified animal, and for that same lactation, from the error data characterizing the distribution of the errors, the method automatically assesses the significance of an error between a prediction and a measured value for each animal individually from data collected during the respective lactation. The confidence interval can be determined automatically for each individual measurement and each individual animal, so there is no need to input different selected confidence intervals for different periods of the lactation, for different categories of animals and for different measured properties. Furthermore, the need for separate research to obtain such confidence intervals is obviated.

Since the significance of errors is assessed for each animal individually, any adverse effect of unreliable predictions due to errors in the choice of the parameters of the time-series model, if applicable, is reduced. For each individual animal and each monitored variable, the width of the confidence interval is automatically adjusted on-line to the empirically found accuracy of fit of the time-series model and can be signalled separately to indicate the reliability of the predictions.

The measured property can for example be one of the following properties: milk yield, milk temperature, milk conductivity, animal activity and intake of at least one type of feed.

The method according to the invention has a prophylactic and accordingly productivity-increasing effect in that it allows an earlier and more reliable identification of individual animals likely to be ill. Firstly, the sooner animals to be checked by a veterinarian can be identified, the better the chances of recovery and the avoidance of adverse effects on the animal are and the better the chances are that further spread of a contagious disease through the herd can be avoided. Secondly, animals having a bad physical condition are accordingly more prone to catching diseases or, if already ill, further diseases. The sooner such animals are identified, the sooner action can be taken to improve the physical condition of such animals and to avoid that the identified animal catches a disease or a further disease A productivity-increasing effect can also achieved by earlier oestrus detection, which allows shortening the calving interval.

According to one particular mode of carrying out the method according to the invention, the error data are used to characterize the mutual dependence between errors in the predictions of the conductivities of milk obtained from different teats (quarters if the animals are cows). The data regarding this dependence are subsequently used for assessing the significance of errors in the prediction of the conductivity of milk obtained from any one of the teats.

According to a further particular mode of carrying out the invention, the error data collected during a lactation are also used to estimate the parameters of the time-series model underlying the predictions of the measured values during that same lactation for each animal individually. Thus, for each individual animal, the time-series model is automatically tailored to an optimal fit to the characteristics of the variations in time of the respective property of that individual animal as the lactation progresses.

Particular features and advantages of the present invention appear from the dependent claims and the detailed description set forth below in which reference is made to the drawings.

DESCRIPTION OF THE PREFERRED EMBODIMENT

Figure 1:
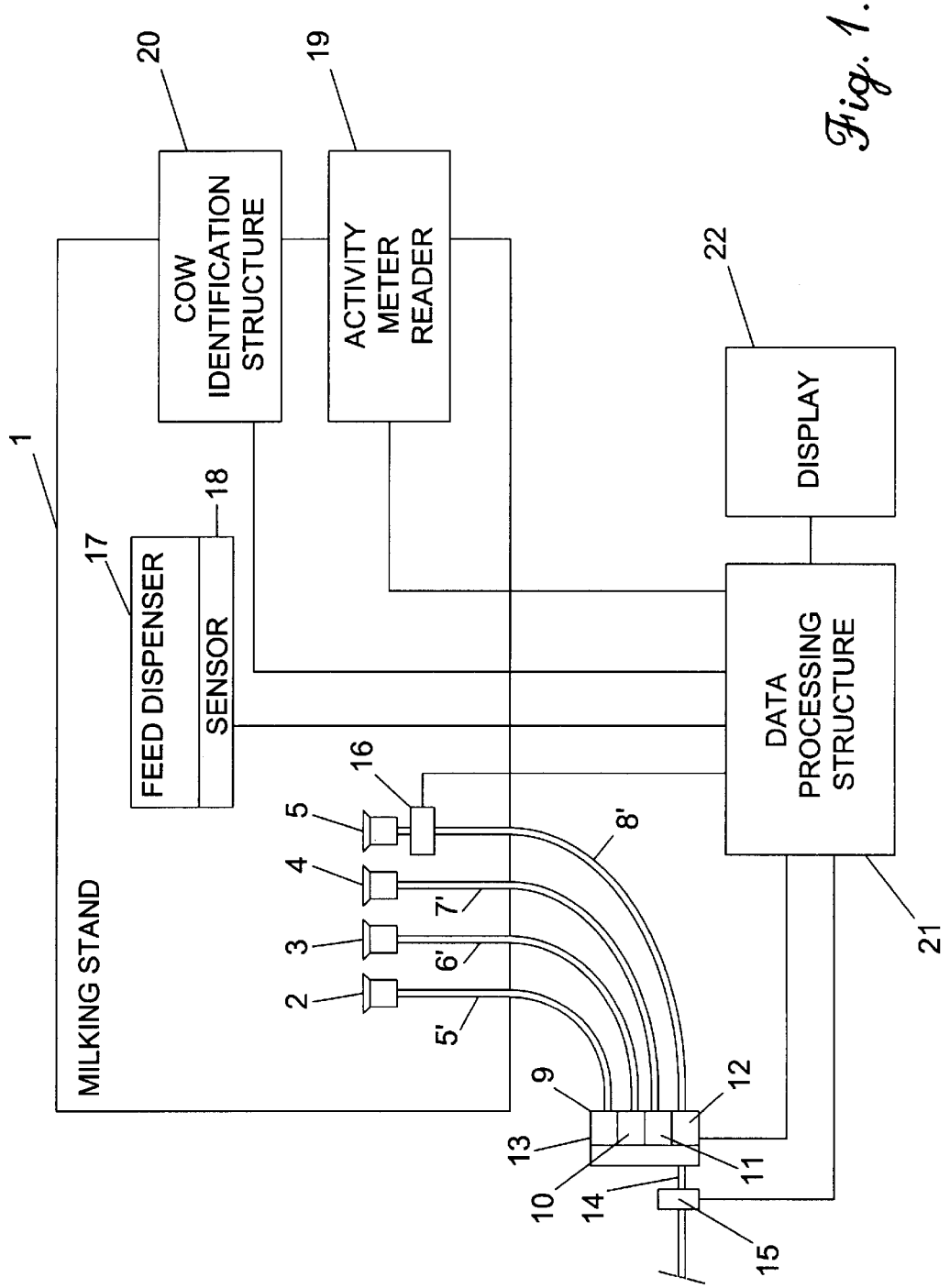
FIG. 1 is a schematic representation of a system according to an embodiment of the invention.
Figure 2:
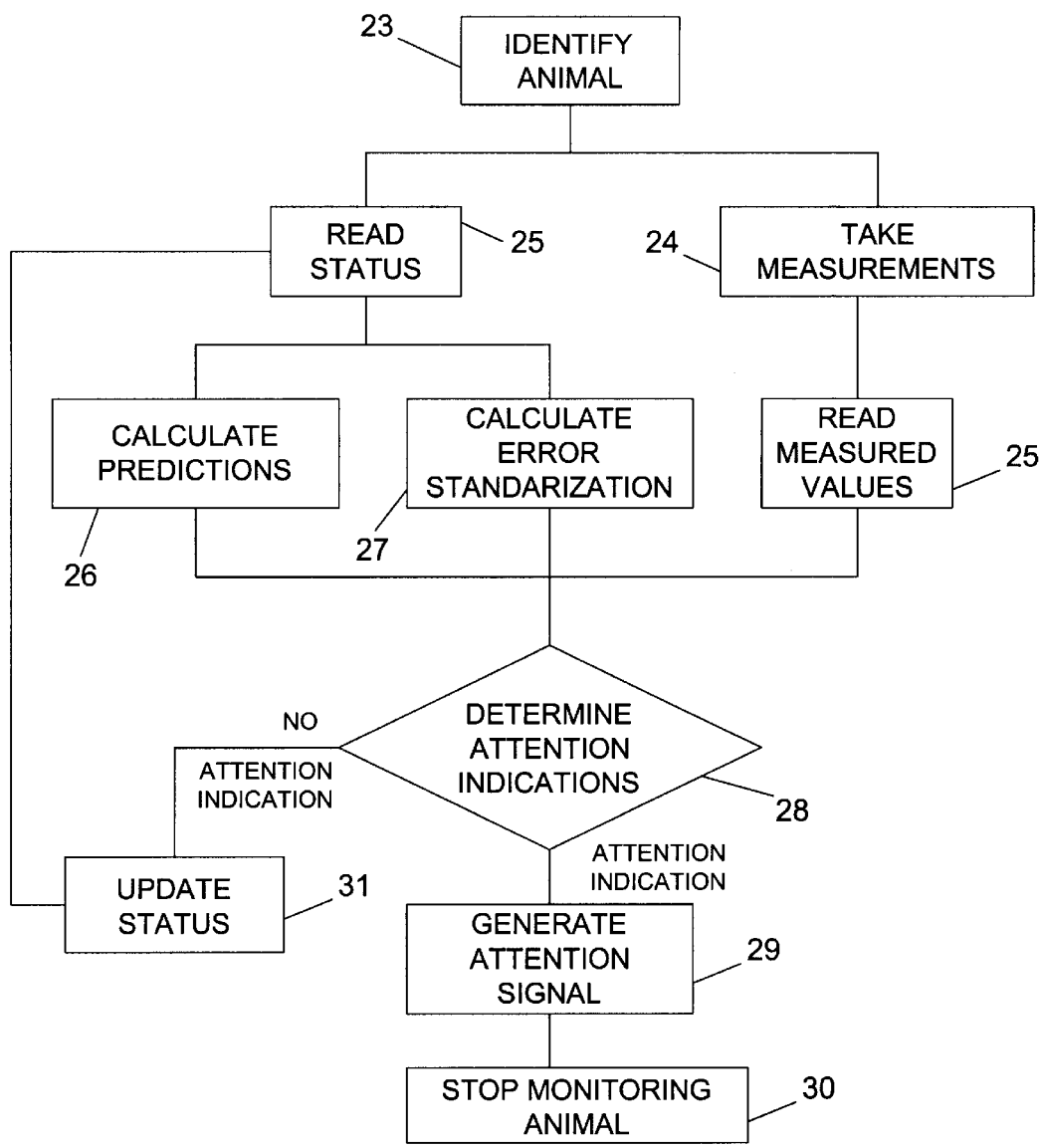
FIG. 2 is a flow chart of a mode of carrying out the method according to the invention.

The system and the method represented by FIGS. 1 and 2 are presently the most preferred modes of carrying out the present invention. Hereinafter, this method and this system are described in the context of monitoring a herd of cows, but in principle, the invention can also be used for monitoring other animals, provided that at least one property of each individual animal can be measured at regular intervals.

The system shown in FIG. 1 is integrated with a milking stand 1 for milking individual cows one by one. The milking stand further includes a milking device with four suction cups 2–5, to be connected to a cow for withdrawing milk from that cow. Milk channels 5'–8' are connected at their upstream ends to suction cups 2–5 and at their downstream ends to the conductivity sensors 9–12. The conductivity sensors 9–12 are part of a conductivity measurement unit 13. In the conductivity measurement unit 13, the milk channels 5'–8' merge downstream from the conductivity sensors 9–12 into a single milk channel 14 passing through a flow meter 15 for measuring the milk yield.

Between the suction cup 5 and the conductivity measurement unit 13, one of the milk channels 8 passes through a temperature sensor 16 mounted closely adjacent the suction cup 5 to reduce the influence of the ambient temperature on the temperature measurement.

The milking stand is further provided with a feed dispenser 17 for offering each milked cow a ration of concentrate. As an alternative, feed dispensers may be provided in feeding stations located outside the milking area. The feed dispenser 17 is adapted to dispense feed as it is consumed by a cow until a predetermined ration has been consumed. The feed dispenser 17 further includes a sensor 18 for monitoring the quantity of feed dispensed to each cow. If the full ration has not been consumed when a cow leaves the feed dispenser, the weight of the left over of the respective ration is calculated.

Each cow of the herd is provided with an activity meter (not shown) which registers a value related to or identical to the cow's activity pattern. To read the values from the activity meters, the milking stand is provided with an activity meter reader 19 for reading a registered value from the activity meter of each cow which is milked, is to be milked or has been milked.

Each cow of the herd is further provided with an identity tag (not shown). The milking stand 1 is provided with a cow identification structure 20 adapted for reading the identity tag of each cow which is milked, is to be milked or has been milked. Animal identification systems and systems for monitoring the activity of animals are commercially available and therefore not further described here.

The conductivity measurement unit 13, the flow meter 15, the temperature sensor 16, the feed sensor 15, the activity meter reader 19 and the cow identification structure 20 are each connected to a central data processing structure 21 for processing the measured data regarding each cow. The data processing structure 21 is connected to a display 22. In addition to or instead of the display 22, it is also possible to provide devices for generating audible alarms. Such devices can for example be operated via a dedicated connection to the data processing structure, via a network (e.g. via the telephone network) or be remotely controlled.

The skilled person will appreciate that the data processing structure is also provided with the necessary peripherals.

Although presented in the form of parallel connections, the communication structure between the sensors and readers 15, 16, 18, 19, 20 and the data processing structure 21 can also be realised in the form of a wired or wireless bus-structure, in which each station has a distinct address.

The data processing structure 21 is programmed for storing measurement data in accordance with the measured properties for each individual, identified animal and for determining a prediction for subsequent measured values of these properties for the respective individual, identified animal from the stored measurement data regarding the respective individual, identified animal.

Furthermore, the data processing structure 21 is programmed for storing error data in accordance with errors between predicted values and measured values for each individual, identified animal, for determining data characterizing the distribution of the prediction errors for each individual, identified animal, for determining a confidence interval for a prediction for each individual, identified animal from the data characterizing the distribution of the errors in the predictions of the measured values, and for activating the signalling device 22 to generate a selected attention signal if an error between the value of a measured property and the prediction for that value is outside the confidence interval.

In operation, the invention is implemented as set forth below with reference to the flow chart shown in FIG. 2. The algorithm according to this flow chart is preferably repeated at each milking.

At each milking of each individual cow, the identification tag is read to identify the respective cow as is denoted by step 23.

Then, values of the milk yield, the milk temperature, the conductivity of the milk obtained from each quarter, the registered value of the activity meter (which may be read with regular intervals upon milkings or at other moments) and the amount of concentrate feed consumed or left over are measured as is denoted by step 24. These measurements are taken at each milking and for each individual, identified animal, i.e. at regular intervals. The measured values are read by the data processing structure 21 as is denoted by step 25.

On the basis of earlier measurements and predictions, or at the first milking of a lactation as an initial set of values and parameters, status data which determine the prediction for each next value to be measured and characterize the distribution of errors in previous predictions have been stored in a memory of the data processing structure 21 for each individual, identified cow. In step 25, this status of the respective identified cow is read by the data processing structure 21.

From the status data as read, a prediction for the values measured in step 24 is made as is denoted by step 26. Furthermore, on the basis of the error data—available in the form of the variance and the covariance of earlier predictions and measured values—a variance-covariance matrix of the error is determined for the respective sets of predictions and measured values as is denoted by step 27. With these error-standardization data, the errors between the current predictions and the measured values can be standardized.

For the feed intake a different approach is preferred; feed left overs mostly equal zero and are sometimes higher. Experimentally obtained data suggest that successive left overs are independent and that for each individual animal there is a distinct probability distribution for the percentage of the left over of the concentrates ration, which is preferably defined by:

$p_0 = P(\text{left over} = 0\%)$, $p_1 = P(0\% < \text{left over} < 10\%)$, $p_2 = P(10\% < \text{left over} < 30\%)$, $p_3 = P(30\% < \text{left over} < 50\%)$, $p_4 = P(50\% < \text{left over} < 100\%)$.

This distribution can be used to calculate the probability $p_{conc}$ of the various levels of concentrate consumption. If the probability $p_{conc}$ as low, an attention signal can be generated or at least a contribution to the likelihood of a special condition is found. The cow-dependent distribution of the probabilities of different ranges of quantities of left overs is fitted to measured left overs for each cow using the Kalmnan filter calculating method as will be described hereinafter.

For the purpose of eliminating structural differences between different milkings (e.g. morning and afternoon milkings), calculations are preferably each time be based on the combined predicted and measured values of two or more successive milkings.

Since standardization data have been determined for the errors of all predictions, it can be determined whether the errors between the predictions and the measured values are within single and combined confidence intervals of which the width can be determined accurately in accordance with the desired balance between sensitivity and specificity. If at least one of the measured values is outside the confidence interval or if a combination of errors symptomatic for a particular condition of an animal occurs, in step 28 it is decided that an attention signal must be generated.

Preferably, attention signals based on a single error are generated if at least one measured value is outside a confidence interval which, after standardization—and assuming the errors for the animal in healthy condition and not in heat have a normal distribution—are outside predetermined confidence intervals. For example a "*" mark can be added to the identification code of a cow if at least one of the measured values is outside a 95% confidence interval, a "" mark can be added to the identification code or a cow if at least one of the measured values is outside a 99% confidence interval, and a "*" mark can be added to the identification code of a cow if at least one of the measured values is outside a 99.9% confidence interval. Preferably, the values on the basis of which the attention signal has been generated and the deviation relative to the predicted value are displayed and/or printed as well.

Preferably, attention signals based on combinations of errors to indicate the likelihood of heat (for example an the form of "h", "hh" and "hhh") are generated if activity is rather high and the combination of activity, yield and temperature falls outside a certain confidence interval. Attention signals to indicate the likelihood of mastitis (for example in the form of "m", "mm" or "mmm") are preferably generated if the conductivity error is rather high and the combination of conductivity, yield and temperature falls outside a certain confidence interval. An attention signal indicating the likelihood of other illnesses (for example in the form "i", "ii" and "iii") is preferably generated if the combined error of yield, temperature and activity falls outside certain confidence intervals and the concentrate intake is at a level having a low probability under normal circumstances.

If it is decided that an attention signal is to be generated, in step 29, the display 22 is controlled to display the selected attention signal in association with the identification data of the respective cow.

After an attention signal has been generated, the model on the basis of which the predictions are being made is not reliable anymore for the respective cow, in particular if the attention signal indicates that a value outside one of the wider confidence intervals has been measured. Therefore, in step 30, the monitoring of a cow on the basis of the collected data is in principle stopped in response to an attention signal regarding the respective animal, or at least in response to an attention signal above a certain confidence level regarding the respective animal.

If it is decided that no attention signal or no attention signal above a predetermined confidence level is to be generated, the status data for the respective individual cow are updated using two of the following three sets of data: the latest measured values, the latest predictions and the latest errors between the predictions and the corresponding measured values. In the flow chart, this is denoted by step 31.

If, after an attention signal has been generated, verification by the farmer or by a veterinarian reveals that the attention signal was unjustified, the measured values are preferably replaced by the predicted values, so the monitoring of the checked animal can be continued on the basis of the previously collected data and the data entered instead of the latest set of measured values. Thus, step 30 can be overruled in the event of a false positive attention signal. In addition, impossible measurement results, such as a milk temperature of more than 50° C., are preferably automatically ignored and replaced by the predicted values, while a warning signal indicating that a measured value has been skipped is displayed or printed. Thus, warning signals indicating the likelihood of malfunction of the measurement structure are obtained as well. Instead of updating on the basis of predicted values, it is also possible to skip the step of updating the status regarding the property for which no usable measurement result is available.

Since the milking stand 1 includes a plurality of suction cups 2–5 and a plurality of milk channels 5'–8', each connected to one of the suction cups 2–5 and a measurement sensor 9–12 for measuring the conductivity of milk passed through the respective milk channel 5'–8' is provided, the conductivity of milk obtained from each quarter can be measured individually. Furthermore, the data structure 21 is programmed for generating an attention signal if the error between the predicted conductivity value and the conductivity value measured by any one of the measurement sensors 9–12 exceeds a threshold value. Thus, an increased conductivity which typically indicates an increased likelihood of mastitis, which typically occurs on or two of the quarters at a time, can be indicated with a very high sensitivity and specificity.

Preferably, the threshold value of the error in the prediction of the conductivity of milk from any quarter is positively related to the average error of the corresponding predictions of all quarters. If the conductivity of milk obtained from all quarters is higher than predicted it is more likely that the deviations are caused by other factors than mastitis, since this disease rarely occurs in all quarters simultaneously, Therefore, a higher sensitivity and specificity can be obtained it the threshold value for any one quarter in response to which an attention signal is generated is higher in response to measured conductivities of milk obtained from the other quarters which are higher than the predicted conductivity as well.

The sensitivity and the specificity of the monitoring method can be further increased if it is also taken into account to what extent the conductivities of milk obtained from different quarters are mutually dependent for each individual animal. This is preferably achieved by providing that the dependence between the conductivity values of mink from different quarters is determined for each animal individually from the measured conductivity values of that individual animal, and that, for each individual identified animal, the influence of the average error on the threshold value is positively related to the dependence between the conductivity values of milk from different quarters determined for that individual identified animal. Thus, for individual cows showing a more independent behaviour of the conductivity values from milk obtained from different quarters, the average error in the predicted conductivity values is of less influence on the threshold level for any one conductivity value than for individual cows of which the variations in the conductivity values of milk obtained from different quarters show a closely related behaviour.

Under normal circumstances, the measured values of the milk yield, the conductivity, the milk temperature and the activity vary gradually in time, i.e. the successive observations of each property are not independent of one another. Therefore, the predictions are preferably made using a time-series model assumed to be valid for healthy cows that are not in heat; unduly great deviations indicate that this assumption is no longer valid, so the monitoring utilizing the model is in principle stopped as described before.

Appropriate time-series models for the different properties can be established by plotting experimental data, examining the correlograms of the autocorrelations, selecting an appropriate ARIMA and fitting the chosen model.

Furthermore, the parameters of the time-series model are preferably estimated for each cow individually from errors between values estimated for that individual cow and corresponding measured values as the respective lactation progresses. Thus a time-series model is obtained, which automatically adapts itself to the characteristics of the respective cow (for example to more or less erratic variations in the measured properties) and other circumstances which influence the characteristics of the variations of the observations in time. Thus, no experiments are needed to establish the best parameter settings of the time-series model under different circumstances, for example to take into account the number of days in milk, the race of the cow, the climate, the feed, the milking habits, different categories of cows (heifers or multiparous cows) etc. Other advantages are, that the risk of inadvertently setting the wrong parameter values is avoided, the method is generally easier to manage and differences between individual cows and successive lactations of each cow are also taken into account. It is noted that the on-line estimation of the parameters of the time-series model is also advantageous in that it provides an automatic tailoring of the time-series model to each individual animal if the confidence interval is not individually determined for each individual animal.

The parameters of the time-series model are preferably estimated using a Kalman filter including a state vector determining the prediction for the next measurement, in which state vector the parameters of the time-series mode; are included.

The Kalman filter is a method to estimate the state of a system on-line. The state is a quantity that determines the coming behaviour of the system. The estimate is improved after each new observation by using the new information. First, a general description is given and later two applications in the method according to the invention are described, in which the state comprises (1) the parameters in the time-serles models and (2) the probability distribution of the percentage of the calculated concentrates left over.

To apply the Kalman filter, the system is described by state-space equations in the form of:

an observation equation:

$$y_t = C_t x_t + v_t \qquad (1),$$

and a system equation:

$$x_t = A_t X_{t-1} + w_t \qquad (2).$$

In these equations $x_t$ is the state vector, $y_t$ the observation vector, $C_t$ and $A_t$ are system matrices, $v_t$ is the random observation error and $w_t$ is the random system error. The observation equation describes the relationship between the measurements and the state, which itself is not directly measurable in general. The system equation defines the relation between the state at successive observations. The distribution of $v_t$ is $N(0, V_t)$ and the distribution of $w_t$ is $N(0, W_t)$.

The estimate of the state $x_t$ at observation t is obtained using the measured values obtained at the observations $y_1$ to $y_{t-1}$. The Kalman filter provides a new estimate of the state after each set of observations and furthermore a variance-covariance matrix for the state estimate.

More in particular, the Kalman filter is a two-stage estimation procedure. In the first stage, an estimate of the state and the variance-covariance matrix is calculated on the basis of the previous state. In the second stage, this estimation is updated in accordance with the set of observations $y_t$ and the estimation error $e_t$ (representing the differences between the values obtained during the set of observations and the predictions). The updated estimates are used in connection with the next set of observations.

The Kalman filter gives the minimium mean square linear estimator of $x_t$. Furthermore, the variance-covariance matrix ot the estimation error $e_t$—on the basis of which the standardization discussed above can be carried out—can also be calculated.

In conventional usage of the Kalman filter in connection with a time-series model, the state would consist of the measured variables. According to the preferred mode of carrying out the invention, the Kalman filter is used to estimate the parameters of the time-series models of the cow variables, therefore the state includes these parameters. The Kalman filter gives a new estimate of the state after each milking, which means new estimates of the parameters of the time-series models. With these new estimates of the parameters, new measurement values are forecasted so that deviant measurements can be signalized reliably and without having to pre-select parararneters of the time-series model which are believed to provide the best fit in the respective situation. The variance-covariance matrix of the estimated state can furthermore be used to relate the errors between predictions and measured values mutually as described above.

The Kalman filter calculation method can also be used to fit the probability distribution of the predetermined concentrate consumption levels with the concentrate consumption levels. To achieve this, a description with state-space equa tions (1) and (2) is used in this case the following definitions apply:

$$x_t = \begin{bmatrix} p_0 \\ p_1 \\ p_2 \\ p_3 \\ p_4 \end{bmatrix}, \quad y_t = \begin{bmatrix} r_0 \\ r_1 \\ r_2 \\ r_3 \\ r_4 \end{bmatrix}, \quad A_t = I, \quad C_t = I \qquad (3)$$

Again, the vector $x_t$ defines the state (here the probability distribution) and the vector $y_t$ is determined by the set of observations with $r_i$ defined as follows:

- if left over = 0%     $r_0 = 1$, $r_i = 0$ if $i \neq 0$
- if 0% > left over > 10%     $r_1 = 1$, $r_i = 0$ if $i \neq 0$
- if 10% > left over > 30%     $r_2 = 1$, $r_i = 0$ if $i \neq 2$
- if 30% > left over > 50%     $r_3 = 1$, $r_i = 0$ if $i \neq 3$
- if 50% > left over > 100%     $r_4 = 1$, $r_i = 0$ if $i \neq 4$ The matrices $A_t$ and $C_t$ are equal to the identity matrix I, $V_t$=and $W_t$=0.01 I.

With these definitions, the estimation error is:

$$e_t = \begin{bmatrix} r_0 - p_0 \\ r_1 - p_1 \\ r_2 - p_2 \\ r_3 - p_3 \\ r_4 - p_4 \end{bmatrix} \qquad (4)$$

A component of $e_t$ is positive when $r_i$=1 and negative when $r_i$=0.

For further details regarding the Kalman filter calculation technique, reference is made to 'Forecasting structural time-series models and the Kalman filter' by A. C. Harvey, Cambridge University Press, Cambridge UK, 1989 and 'Bayesian forecasting' by P. J. Harrison & C. F. Stevens, *J. of the Royal Stat. Soc.*, 38, p.205–247, 1976.

The monitoring method and system according to the presently most preferred mode of carrying but the invention have been tested experimentally. Results indicate that already without fine-tuning a very good sensitivity and a good specificity are obtained as appears from the tables set forth below (the numbers of stars correspond to the confidence intervals described above):

TABLE 1

Sensitivity and specificity for heat based on 537 cases and 41803 milkings outside heat periods.

| attention | sensitivity | specificity |
|---|---|---|
| * | 94.2% | 94.5% |
| ** | 86.5% | 96.9% |
| *** | 82.5% | 98.1% |

TABLE 2

Sensitivity for disease (mastitis excluded) and specificity of the detection model, based on 263 cases and 40286 milkings outside illness periods.

| attention | sensitivity | specificity |
|---|---|---|
| * | 99.6% | 86.0% |
| ** | 90.5% | 93.5% |
| *** | 76.8% | 96.7% |

TABLE 3

Sensitivity for four different mastitis types and the specificity for mastitis.

| attention | sens. clinical mastitis (52 cases) | sens. subclin. mastitis (21 cases) | sens. latent mastitis (35 cases) | sens. secretion disturb. (36 cases) | specificity |
|---|---|---|---|---|---|
| * | 96% | 100% | 89% | 97% | 95.3% |
| ** | 90% | 76% | 57% | 86% | 98.2% |
| *** | 65% | 57% | 37% | 67% | 99.4% |

What is claimed is:

1. A system for monitoring the physical condition of a herd of livestock comprising:
   a measurement device for measuring a value of at least one property associated with an individual, identified animal of the herd,
   an identification structure for identifying individual animals of the herd,
   a data processing structure operatively connected to said measurement device and to said identification structure, and
   a signaling device for generating attention signals connected to said data processing structure, said data processing structure being programmed for:
   collecting measurement and error data in accordance with previously measured and predicted values of said at least one property associated with each individual, identified animal,
   determining a prediction for at least one subsequent measured value of said at least one property for said individual, identified animal from said stored measurement and error data associated to said individual, identified animal,
   determining a confidence interval for a prediction for each individual, identified animal from said error data,
   measuring a value of at least one property at regular intervals from each individual, identified animal,
   comparing measured values with corresponding predicted values and confidence intervals, and
   activating the signaling device to generate an attention signal in response to an error between the value of said at least one measured property and the prediction for that value outside said confidence interval.

2. A system according to claim 1, wherein the measurement device comprises a conductivity measurement unit for measuring the conductivity of milk obtained from an individual, identified animal, and said data processing structure is programmed for generating an attention signal if the error between a predicted value and the conductivity value measured by said measurement unit exceeds a threshold value.

3. A system according to claim 2, wherein a milking stand for milking an individual animal, said milking stand having a plurality of suction cups and a plurality of milk channels, connected to the suction cups, respectively, the conductivity measurement unit including sensors for measuring the conductivity of milk passing through the respective milk channels for individually measuring the conductivity of milk obtained via each suction cup, wherein said data processing structure is programmed for generating an attention signal if the error between the predicted conductivity value and the conductivity value measured by any one of said measurement sensors exceeds a threshold value.

4. A system according to claim 1, further including a measurement sensor for measuring the intake of at least one type of feed by each individual, identified animal, wherein said data processing structure is programmed for determining, for each individual, identified animal, a time-independent probability distribution from measured feed intakes and for generating an attention signal if the measured intake of said type of feed by an individual, identified animal is below a predetermined probability level.

5. A method for automatically monitoring the physical condition of a herd of livestock including the steps of:
   collecting measurement and error data in accordance with previously measured and predicted values of at least one measured property for each individual, identified animal,
   measuring a value of said at least one property at regular intervals from each individual, identified animal,
   determining at least one prediction for each individual, identified animal from said error data,
   comparing measured values with corresponding predicted values and confidence intervals, and
   generating an attention signal in response to an error between the value of said at least one measured property and the prediction for that value above a predetermined level determined by said confidence interval.

6. A method according to claim 5, wherein the measured property includes the conductivity of milk obtained from each individual, identified animal and an attention signal is generated if the error between the predicted conductivity value and the measured conductivity value for any individual, identified animal exceeds a threshold value individually determined for that individual, identified animal.

7. A method according to claim 6, wherein said conductivity is individually measured for milk obtained from each teat and an attention signal is generated if the error between the predicted conductivity value and the measured conductivity value of milk obtained from any teat exceeds a threshold value individually determined for milk obtained from that teat of that individual, identified animal.

8. A method according to claim 7, wherein said threshold value of the error in the prediction of the conductivity of milk from any teat is positively related to the average error of the corresponding predictions of all teats.

9. A method according to claim 8, wherein the dependence between the conductivity values of milk from different teats is determined for each animal individually from the measured conductivity values of that individual animal, and, for each individual, identified animal, the influence of the average error on said threshold value is positively related to the dependence between the conductivity values of milk from different teats determined for that individual, identified animal.

10. A method according to claim 6, wherein said prediction is made using a time-series model and parameters of the time-series model are estimated for each animal individually from errors between values estimated for that individual animal and corresponding measured values.

11. A method according to claim 10, wherein said parameters are estimated using a Kalman filter including a state vector determining the prediction for the next measurement, the parameters of the time-series model being included in said state vector.

12. A method according to claim 6, wherein during each measurement the values of at least two properties are measured, the errors in the predictions are standardized using said error data, and an attention signal is generated if the combined standardized errors are outside a predetermined confidence interval.

13. A method according to claim 6, wherein for each individual, identified animal a time-independent probability distribution is determined from measured feed intakes and an attention signal is also generated if the measured intake of said type of feed by an individual animal is below a predetermined probability level.

* * * * *